(12) United States Patent
Boyer (10) Patent No.: US 7,972,035 B2
(45) Date of Patent: Jul. 5, 2011

(54) ADJUSTABLE LIGHTING APPARATUS

(75) Inventor: John D. Boyer, Lebanon, OH (US)

(73) Assignee: LSI Industries, Inc., Cincinnati, OH (US)

( * ) Notice: Subject to any disclaimer, the term of this patent is extended or adjusted under 35 U.S.C. 154(b) by 265 days.

(21) Appl. No.: 12/254,107

(22) Filed: Oct. 20, 2008

(65) Prior Publication Data

US 2009/0109670 A1    Apr. 30, 2009

Related U.S. Application Data

(60) Provisional application No. 60/982,240, filed on Oct. 24, 2007.

(51) Int. Cl.
*F21V 21/30* (2006.01)

(52) U.S. Cl. .......................... 362/289; 362/244; 362/428

(58) Field of Classification Search .................. 362/289, 362/273, 287, 427, 249.03, 249.07, 269, 362/285, 147, 418, 372, 428, 244, 35
See application file for complete search history.

(56) References Cited

U.S. PATENT DOCUMENTS

| | | | |
|---|---|---|---|
| 3,702,928 A * | 11/1972 | Alger | 362/33 |
| 5,155,303 A | 10/1992 | Bensel, III et al. | |
| 5,173,025 A | 12/1992 | Asami | |
| 5,481,443 A | 1/1996 | Wagner et al. | |
| 5,609,408 A | 3/1997 | Targetti | |
| 6,893,139 B2 | 5/2005 | Cercone et al. | |
| 7,159,997 B2 | 1/2007 | Reo | |
| 7,311,423 B2 | 12/2007 | Frecska | |
| 7,434,967 B2 * | 10/2008 | Dupre | 362/366 |
| 7,775,679 B2 * | 8/2010 | Thrailkill et al. | 362/237 |
| 7,775,695 B1 * | 8/2010 | Rose | 362/493 |
| 2001/0049857 A1 | 12/2001 | Uchida et al. | |
| 2002/0044443 A1 | 4/2002 | Kira et al. | |
| 2002/0064054 A1* | 5/2002 | Sugimoto et al. | 362/523 |
| 2003/0161153 A1 | 8/2003 | Patti | |

(Continued)

FOREIGN PATENT DOCUMENTS

AU    2006/203036 A1    7/2006

(Continued)

OTHER PUBLICATIONS

International Search Report for corresponding PCT Application No. PCT/US2008/080469.

(Continued)

*Primary Examiner* — Jong-Suk (James) Lee
*Assistant Examiner* — Peggy A. Neils
(74) *Attorney, Agent, or Firm* — McDermott Will & Emery LLP (57) ABSTRACT

A lighting apparatus having a pivotable light cartridge for positioning and directing the light output of a plurality of light sources, the light cartridge including an elongated base oriented along the longitudinal axis, a pivot at the opposed first and second ends of the light cartridge along the longitudinal axis, a plurality of light sources, and an longitudinal wall extending from the lateral edge of the base, the wall including a plurality of spaced-apart, radially-extending ribs, each having a distal edge. A rotatable worm gear having a helical thread is positioned in mechanical engagement with a portion of the distal edges of the plurality of ribs, so that rotation of the worm gear with a hand tool effects pivoting of the light cartridge along the longitudinal axis.

15 Claims, 6 Drawing Sheets

U.S. PATENT DOCUMENTS

| | | | |
|---|---|---|---|
| 2004/0090785 A1 | 5/2004 | McInnis | |
| 2005/0241103 A1 | 11/2005 | Dobson et al. | |
| 2006/0146531 A1 | 7/2006 | Reo | |
| 2006/0193142 A1 | 8/2006 | Dupre | |
| 2006/0262542 A1 | 11/2006 | Ibbitson et al. | |
| 2007/0064425 A1 | 3/2007 | Frecska | |
| 2008/0239709 A1* | 10/2008 | Rapeanu et al. | 362/147 |

FOREIGN PATENT DOCUMENTS

| | | |
|---|---|---|
| CN | 2735164 Y | 10/2005 |
| CN | 1807971 A | 7/2006 |
| CN | 1912458 A | 2/2007 |
| DE | 10 2006 001 289 | 7/2007 |
| EP | 1 657 486 | 5/2006 |
| EP | 1 860 369 | 11/2007 |
| WO | WO 2005/075886 | 8/2005 |
| WO | WO 2007/113656 | 10/2007 |

OTHER PUBLICATIONS

Written Opinion for corresponding PCT Application No. PCT/US2008/080469.

Office Action dated Jun. 30, 2010 from corresponding Chinese Application No. 200880011193.3. English translation enclosed.

The Response to the Office Action filed in corresponding Chinese Application No. 200880011193.3 (English translation attached).

Office Action dated Feb. 8, 2011 from corresponding Australian Application No. 2008317060.

* cited by examiner

ADJUSTABLE LIGHTING APPARATUS

FIELD OF THE INVENTION

The present invention relates generally to luminaires and other light fixtures and, more particularly, to a lighting apparatus facilitating adjustment of the direction of the light sources and, therefore, the light emitted from the lighting apparatus. Although useful with most light sources, the present invention is particularly useful with light emitting diodes.

BACKGROUND OF THE INVENTION

As advances have been made in the quality and energy efficiency of light emitting diodes (LEDs), the production cost of LEDs has gone down, and LEDs are being commonly used in a wide variety of area lighting applications. Initial efforts to incorporate LEDs into lighting fixtures have involved retrofitting LEDs into conventional luminaires or onto or into the shape of conventional lighting lamps.

More recently, luminaires are being designed to account for the function and specifications of LEDs. LEDs are typically combined together in arrays onto printed circuit boards (PCBs) for ease of handling and modularity. Assembling the LEDs and the PCBs into a housing or luminaire can require precise positioning of the individual LEDs and/or the PCBs to achieve the desired array or required lighting effects from the plurality of LEDs and their associated optics or reflectors. Retrofitting LEDs into an existing luminaire or housing can raise issues related to positioning and securing the LEDs or PCBs into the housing or luminaire, to providing the correct and adequate power and controls for the LEDs, and to maintaining the appropriate appearance and aesthetics of the luminaire.

An LED emits produced light in a lambertian distribution. To control and direct this light, a means of reflecting or refracting (bending) the light rays from the LED is typically used. A typical refractor is an optic or lens that is associated with one or a plurality of the LEDs, to bend the emitted light into a desired direction or directions, or into a particular light pattern. An optic typically transmits all of the light emitted from the LED, therefore allowing the optimum opportunity to direct and control the light. Various reflector devices have been employed, each associated with one or a plurality of the LEDs. A reflector can be positioned over a single LED, to shape the emitted light that reflects off of its surface into a desired direction or pattern. Other reflectors can be positioned adjacent a plurality of LEDs to reflect light more generally from the group of LEDs.

In addition to controlling and directing the light emitted from each LED, it is desirable to control and direct the orientation of one or more LEDs, such as an array or matrix of LEDs, into a particular shape or pattern, or into a particular one or more directions. One means of directing light emitted from an array of LEDs arranged on a strip is disclosed in US Publ. 2007-0064425, which employs rotating assemblies to rotate the strips along the main axis thereof.

An LED generally includes a diode mounted onto or formed in a die or chip (collectively referenced as "die" hereinafter for simplicity). The diode is then surrounded by an encapsulant. The die receives electrical power from a power source and supplies power to the diode. The die can be mounted in a die support. To produce a brighter LED, generally, more power is delivered to the LED. Many LED lighting systems dissipate heat through a different heat transfer path than ordinary filament bulb systems.

A typical means of dissipating heat from an LED lighting system includes a heat sink adjacent to the source of heat having one or more surfaces, and a means for dissipating heat, such as a plurality of fins or ribs which project outwardly substantially normal to the plane of the surface(s). The heat sink surface(s) and the surface of the fins provide a flow path surface over which a fluid, most likely air, will flow to facilitate heat dissipation. The fins increase the surface area of the heat sink for conducting heat from the heat sink to the air. Examples of such heat sinks with fins are shown in U.S. Pat. Nos. 6,864,513 and 7,255,460, and US Publ 2007-0041220.

Despite the continued progression of new and improved LED luminaires, there remains a need to provide improved, long-life LEDs lighting fixtures for use on illuminating work and facilities spaces.

SUMMARY OF THE INVENTION

The present invention relates generally to a lighting apparatus comprising a housing including at least one array having at least one light source, which may include or be constituted entirely of LEDs, and configured for selectively directing light.

The invention relates to a pivotable light cartridge having opposed first and second ends and a longitudinal axis, and including: i) an elongated base oriented along the longitudinal axis and having a lateral edge; ii) a pivot associated with the opposed first and second ends of the light cartridge along the longitudinal axis; iii) at least one longitudinal wall extending from the lateral edge of the base, the wall having an outer surface and including a plurality of spaced-apart, radially-extending ribs, each having a proximal edge fixed to the outer surface of the wall, and a distal edge; and iv) structure for securing at least one light source to the light cartridge. The longitudinal extending wall extends along a portion of a circumferential surface defined at a radius from the longitudinal axis. The at least one light source preferably comprising an array of LEDs.

The invention also relates to a pivotable lighting assembly, comprising: (a) at least one pivotable light cartridge, having opposed first and second ends and a longitudinal axis, and including: i) an elongated base oriented along the longitudinal axis and having at least one lateral edge; ii) a pivot associated with the opposed first and second ends of the at least one light cartridge along the longitudinal axis; iii) at least one longitudinal wall extending from the at least one lateral edge of the base, the wall including a plurality of spaced-apart, radially-extending ribs, each having a proximal edge fixed to the wall and a distal edge; and (b) the at least one light cartridge preferably comprising a plurality of LEDs.

The invention further relates to pivotable LED lighting system, comprising: (a) at least one pivotable LED lighting assembly as described herein; and (b) a rotatable worm gear having an longitudinal axis perpendicular to the longitudinal axis of the light cartridge, and including a helical thread at a pitch in mechanical engagement with a portion of the distal edges of the plurality of ribs; wherein rotation of the worm gear effects pivoting of the at least one pivotable lighting assembly.

The invention further relates to a luminaire comprising: (a) a housing having opposed first and second ends; and (b) at least one pivotable LED lighting system.

The invention also relates to the ornamental shape and design of the pivotable light cartridge, the LED lighting assembly, the LED lighting system, and the luminaire.

DETAILED DESCRIPTION OF THE INVENTION

Figure 1:
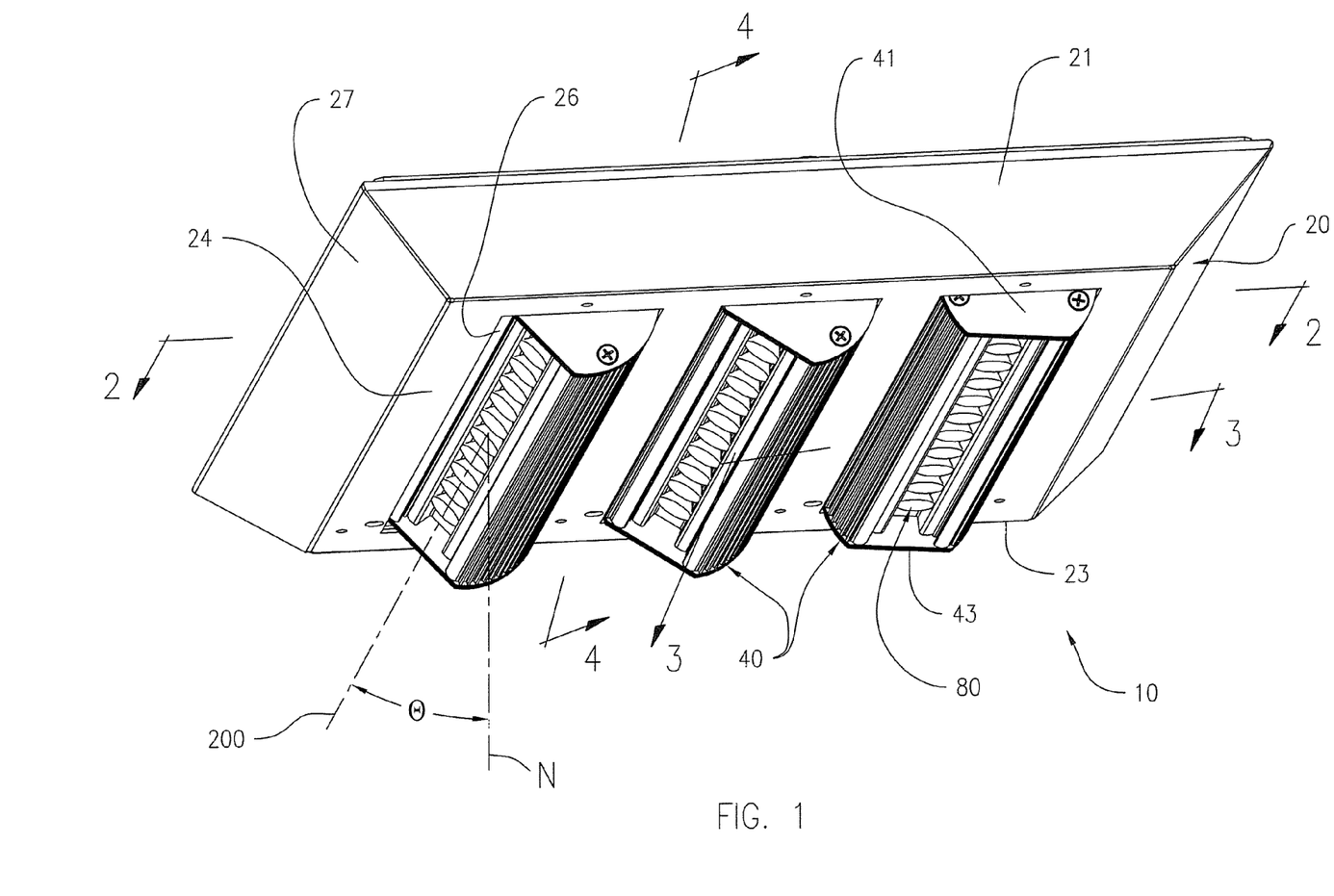
FIG. 1 shows a perspective view of one embodiment of the present invention, including a housing with a plurality of pivotable lighting assemblies.

Referring now to the drawings, FIG. 1 shows a perspective view of a preferred lighting apparatus 10 structure of the present invention, including a housing 20 and a plurality of light cartridges 40 that are pivotally affixed to the housing 10 along their respective longitudinal axes, in order to pivot the light emitted by a plurality of light sources positioned within each of the light cartridges 40. The light cartridge 40 is shown having endplates 41 and 43 at opposed ends of the light cartridge associated with the opposed ends 21 and 23 of the housing in a pivoting manner, as described herein below.

Figure 2:
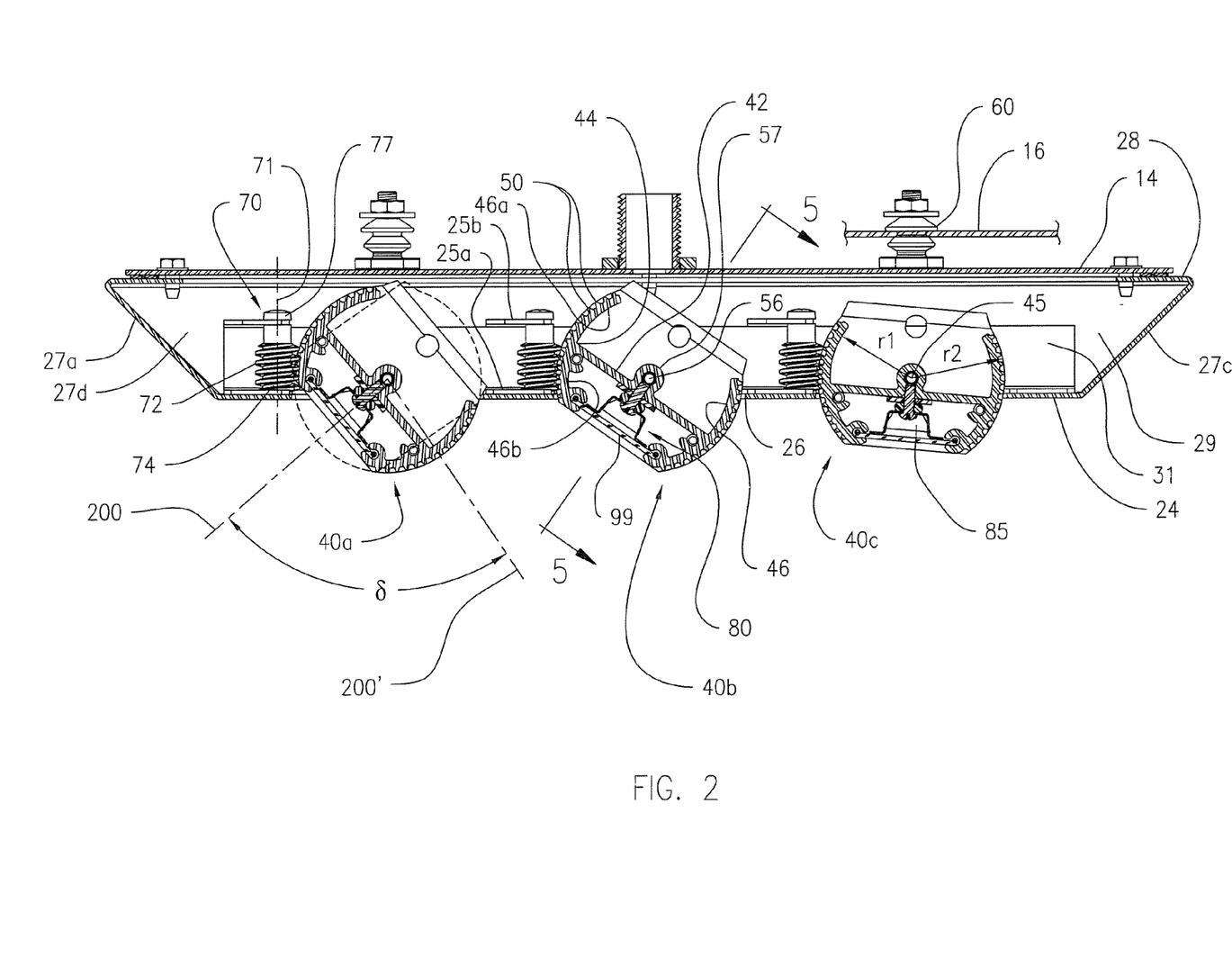
FIG. 2 shows a cross-sectional elevation view of the embodiment of FIG. 1, taken through line 2-2 of FIG. 1.

Referring to FIG. 2, the housing includes a base plate 24 having a plurality of substantially rectangular openings 26 through which a portion of the light cartridge 40 extends. The base plate 24 and a plurality of sidewalls 27 surrounding the base plate define an internal cavity 29 within the housing. The base plate can be an integral part of, or a separate element affixed to, the sidewalls 27 of the housing 20. The distal ends of the sidewalls 27 have an inwardly extending flange 28 that has a threaded hole in which a mating threaded screw can be run to secure the housing 20 to a mounting plate 14. The vertical height of the housing, illustrated as the distance between the base plate 24 and the flange 28 is made sufficient to permit the light cartridges 40 to rotate within the cavity 29.

Figure 3:
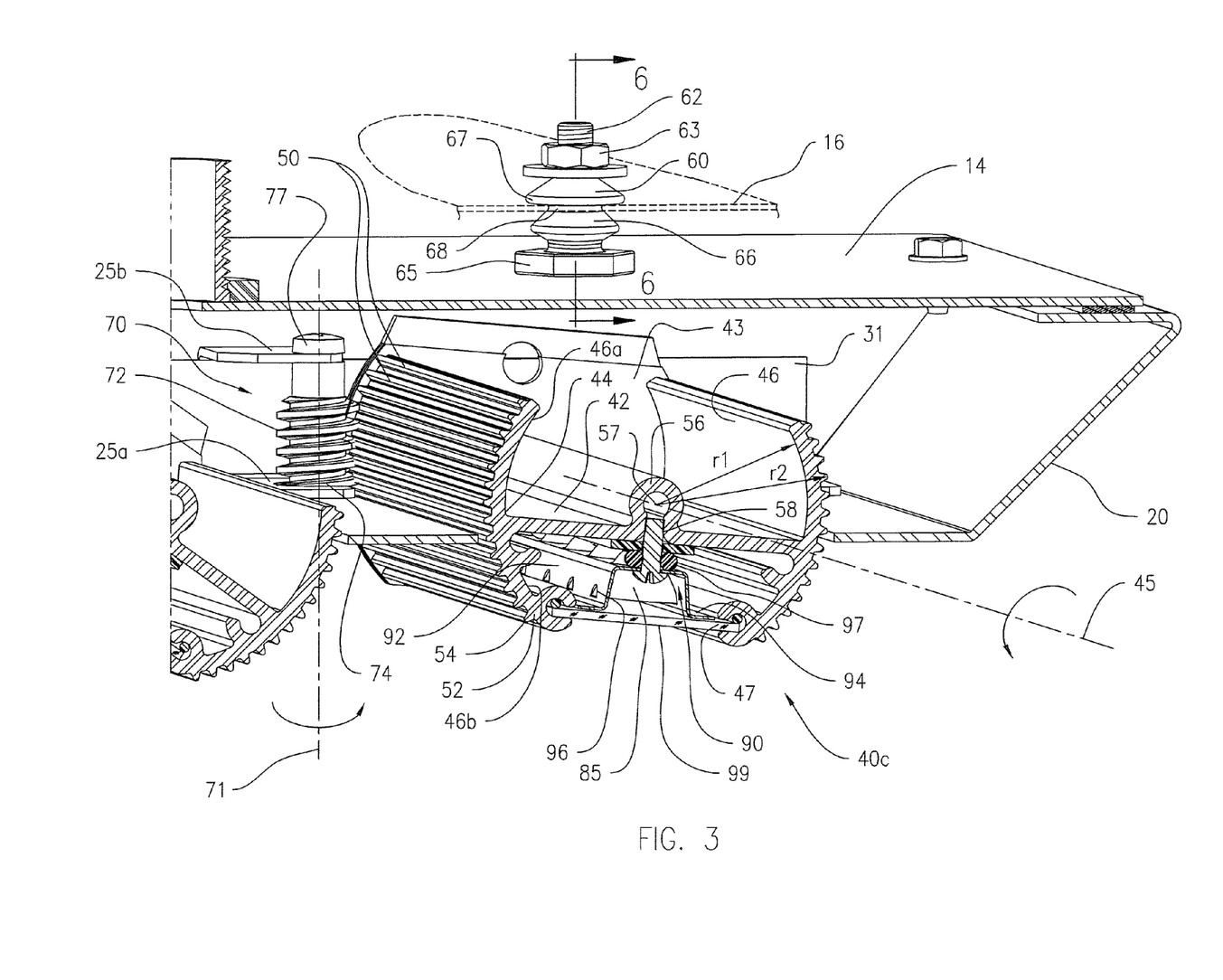
FIG. 3 shows a detailed view of a portion of FIG. 2, showing one of the pivotable lighting assemblies.

Each light cartridge 40 (the three light cartridges of the embodiment depicted in FIG. 2 are labeled 40a, 40b, and 40c) includes a pair of walls 46 that extend from opposed lateral edges 44 of an elongated base 42. In the illustrated embodiment, each wall 46 includes an upwardly-extending first wall portion 46a and a downwardly-extending second wall portion 46b, which extend from the opposed lateral edges 44 in opposite directions and circumferentially with an inner surface defined by a first radius r1 from the longitudinal axis 45 of the light cartridge 40. As also seen in FIG. 3, the base 42 passes proximate to the axis 45, and the base is formed to comprise a loop portion 56 that defines a round central passage 57 along which the longitudinal axis 45 lies, and tapered channel 58. As described herein, the loop portion 56 facilitate pivoting of the light cartridge 40 at opposed endplates 41 and 43.

Each of a plurality of ribs 50 has a proximal edge 52 that extend along the length of the outer surface of wall 46, and is spaced circumferentially apart from adjacent ribs 50 along the wall 46. Each rib 50 extends substantially radially outwardly from the centerline axis 45 to a longitudinal distal edge 54. The radial length of the ribs can be selected to increase the surface area of the ribs and thus the outside surface of the wall that is exposed to the ambient environment, for improved dissipation of heat generated by the light sources that is communicated to the ribs via the base 42 and walls 46. The longitudinal length of the ribs is preferably coextensive with the length of the walls 46 and the overall length of the light cartridge 40, though the length can be less. Preferably, the distal edges 54 of each of the ribs 50 are parallel to each other and have a fixed the pitch (the circumferential distance between adjacent distal edges 54 along the radius r2). In one embodiment, each light cartridge 40 is comprised of extruded 6063 aluminum and provides sufficient structural strength as well as ample conduction of heat from the light sources for convention and conduction to the surrounding environment.

In an alternative embodiment, the base 42 can be disposed remotely from the longitudinal axis 45 of the light cartridge, where the walls 46 extend in one direction from the base 42 circumferentially along the first radius r1. In yet another alternative embodiment, the base 42 can include additional base elements having base lateral edges that are affixed to the walls 46, to provide added structural support as needed.

In an alternative embodiment, the wall 46 can be a substantially planar (or other shape) wall, extending from the base lateral edges 44 substantially perpendicular to the base, and wherein the plurality of radially extending ribs have different lengths wherein their distal edges lie in a circumference along the second radius r2 from the longitudinal axis 45.

Figure 4:
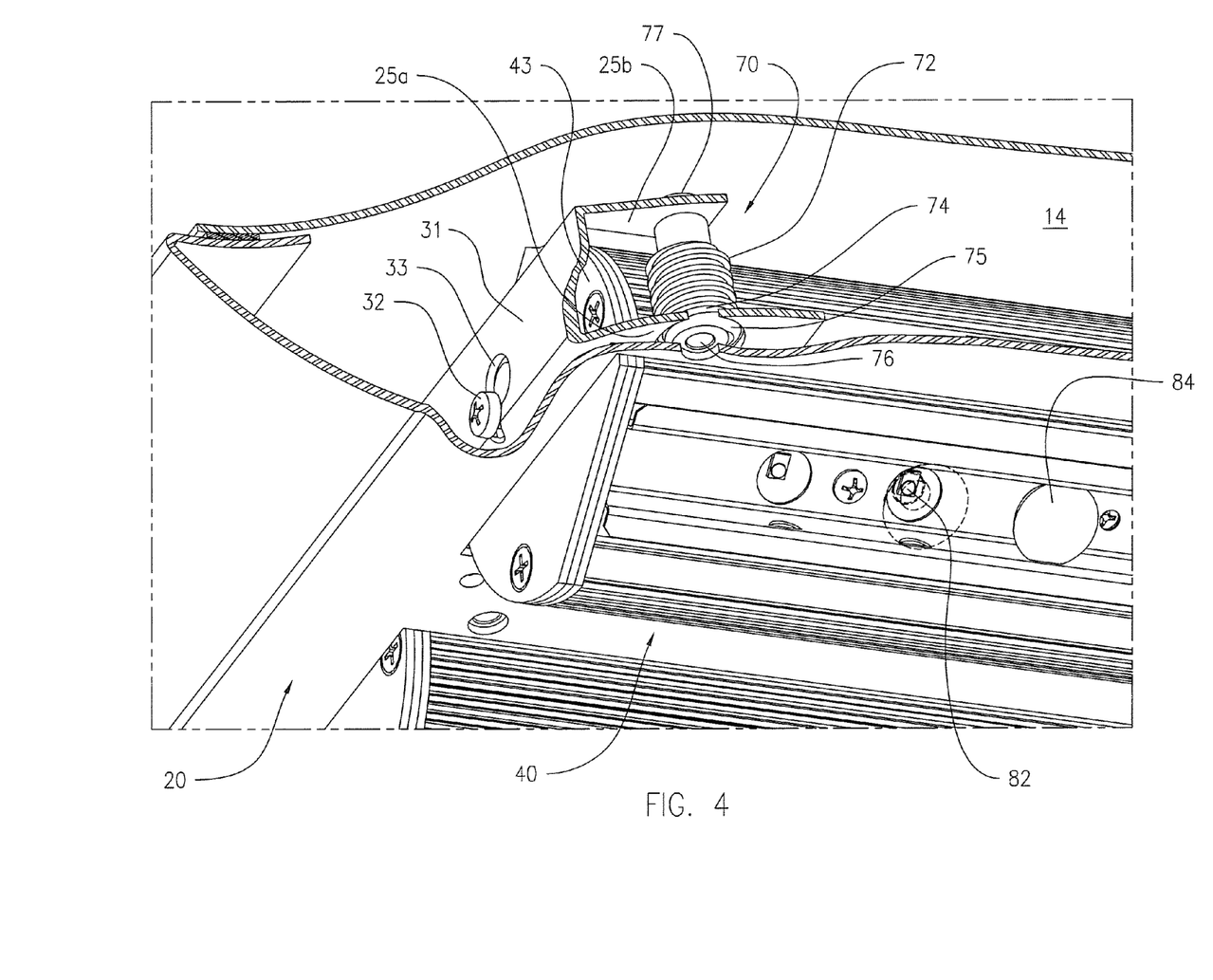
FIG. 4 shows a detailed cross-sectional elevation view of a portion of the embodiment of FIG. 1, taken through line 4-4 of FIG. 1.
Figure 5:
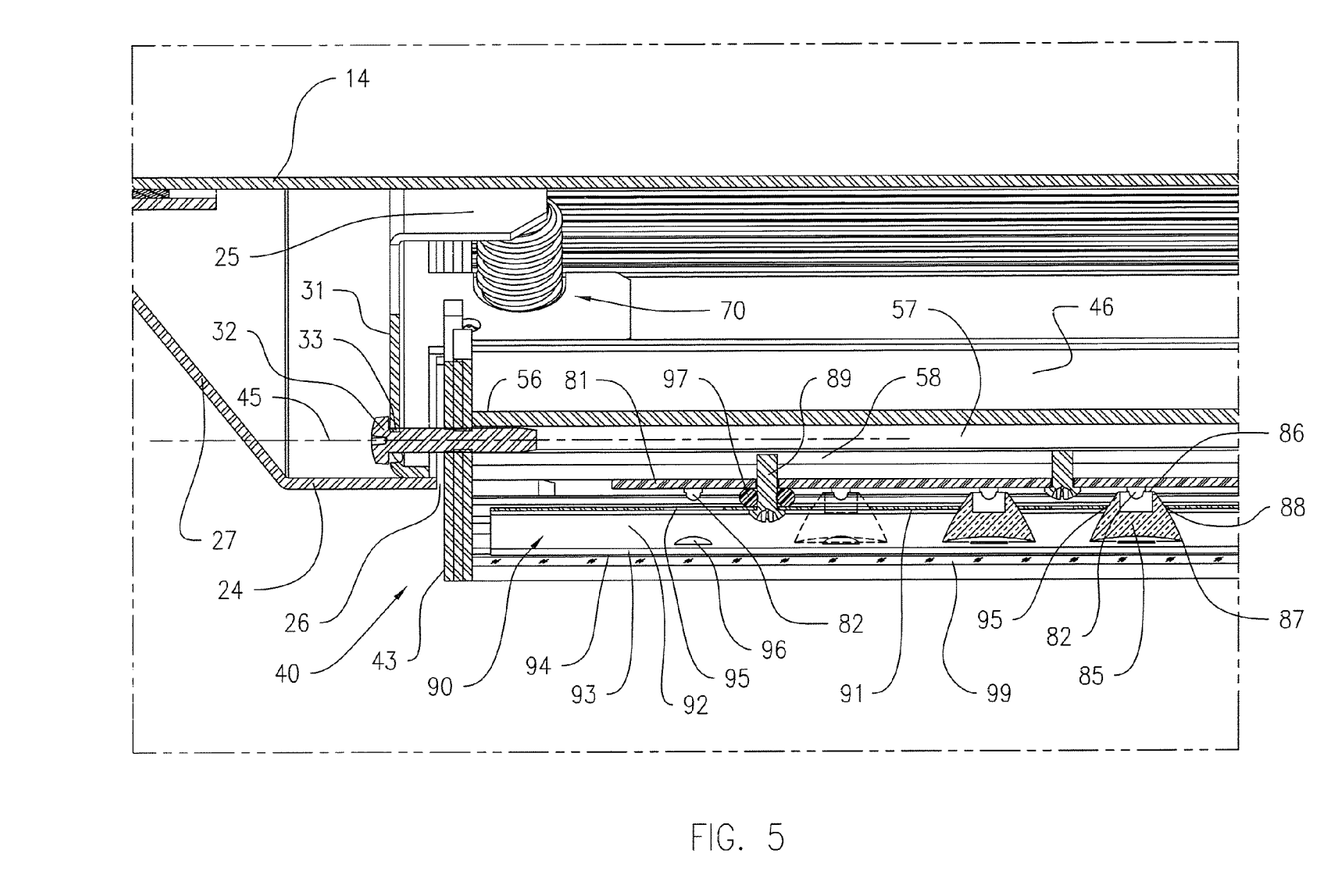
FIG. 5 shows a cross-sectional elevation view of the pivotable light assembly of FIG. 1, taken through line 5-5 of FIG. 1.

As shown in FIGS. 3, 4 and 5, structure for pivoting the light cartridge 40 within the housing 20 includes an end bracket 31 attached to the housing adjacent each end 21 and 23 of the light cartridge 40. The end brackets 31 each have a through hole 33 that is aligned with the central passage 57 of the cartridge 40 through end plates 41, 43. In the depicted embodiment, a threaded screw 32 resides in the through hole 33, a hole in the endplate 43, and is threaded into the end of the loop portion 56, whereby the light cartridge 40 can freely pivot about the longitudinal axis 45 relative to the housing to direct light as desired. Other structures for pivoting the cartridge 40 relative to the housing 20 are also contemplated.

The depicted embodiment of the lighting apparatus 10 also employs a geared drive mechanism for pivoting the light cartridge 40 about the longitudinal axis 45 within the housing. Control of the pivoting of the light cartridge within the housing can be provided by rotatable worm gear 70, which is positioned with its longitudinal axis 71 substantially perpendicular to the longitudinal axis 45 of the light cartridge 40, and is depicted as positioned adjacent an end of the light fixture 40 whereby the helical thread 72 of the worm gear 70 operably meshes with an end portion of at least one of the ribs 50. The end portions of the plurality of ribs 50 resembles a portion of a spur gear. In one embodiment, the helical thread 72 of the worm gear 70 has a pitch that matches the circumferential pitch of the distal edges of the ribs 50, whereby a single rotation of the worm gear 70 causes the cartridge 40 to rotate the distance of one base pitch (the circumferential distance between the distal edge of one rib to the distal edge of the adjacent rib). The gear ratio (equivalent to the number of rotations of the worn gear to effect a single complete rotation of the light cartridge) is generally at least about 40:1 and less than about 80:1, and is typically about 60:1. In the depicted embodiment, the worm gear 70 is fixed in position by seating and capturing an annular shoulder at its first end 74 in an opening 75 in a lower flange 25a that extends from the lower edge of end bracket 31, and the opposed second end against the upper flange 25b that extends from the upper edge of end bracket 31, with a fastener, such as screw 77.

The worm gear 70 illustrated in FIG. 3 is a right-handed thread, whereby clockwise rotation of the worm gear 70, facing the lower end 74, causes the helical thread to thread away from the viewing position (upward as viewed in FIG. 3), thereby causing the light cartridge 40c to pivot in a counter-clockwise direction about axis 45, as viewed in FIG. 3. Clockwise rotation of the light fixture is accomplished by rotating the worm gear, from the end 74, in the counter-clockwise direction. Typically the first end 74 of the worm-gear 70 has a slot 76, or alternatively a hexagonal hole, or similar recess that can be engaged by a hand tool, such as a screw driver or alien wrench, for manually rotating the worn gear 70 to rotate the cartridge and direct the light emanating therefrom as desired.

The shape of the thread of the worn gear and the shape of the distal edges of the ribs can be adapted and modified to achieve desired contact and performance characteristic of the worn gear with the distal edges of the ribs, as is well known in the art. Likewise, the longitudinal axis 71 of the worth gear 70, and the meshing of the helical thread of the worm gear with the spur gear-like ribs of light cartridges can be adapted and configured for optimal fit and performance by means well known in the art.

The worm-gear 70 also inhibits and prevents the light cartridge 40 from unintended rotating or pivoting. It can be understood that, provided that the worm gear 70 is rotationally stationary, rotational advancement of the distal edges 54 of the ribs is effectively blocked by the extended thread 72 of the worm gear thereby holding the direction of the light cartridge 40 and the light emanating therefrom. In one embodiment, the worm gear 70 is comprised of a #A 1M 5-N24 nylon gear from Stock Drive Products/Sterling Instrument. Other types of gears can be used in place of the worm-gear, including a helical gear. Other manners of selectively pivoting the light cartridges 40 are also contemplated.

As illustrated, the light cartridges 40 are positioned through openings 26 in the base plate 24 of the housing in order to emit light from the light sources to the target destination. Typically, the light sources are disposed in or near the bottom of the light cartridge 40, and extend below the bottom surface of the housing 20 (base plate 24 in the depicted embodiment), in order to maximize the angle θ of the light emitted from the light cartridge in one pivoted direction 200, and in the opposed pivoted direction 200', relative to nadir N, and the overall travel angle 6 between directions 200 and 200', shown in FIG. 2. The light cartridges 40 need not, however, extend below the bottom surface of the housing 20.

As shown in FIGS. 3 and 5, a plurality of light sources are typically positioned within each light cartridge 40 along its length in a light source assembly 80. In a preferred embodiment, each light source comprises an LED 82. The lighting apparatus 10 of the present invention can, however, employ any type of light source known to date or hereinafter created. An assembly of LEDs, such as that depicted, typically includes: a light board 81 comprising power and control circuitry for the LEDs 82, and provides a substrate on, or in, which each LED 82 and other components of the assembly can be created or deposited; the LEDs 82 themselves (which may be created in the PCB through known deposition and/or etching processes); and an optic 85 (such as a lens or other refractive element, or a reflector) for directing at least a portion of the emitted light from the LED 82. The depicted LED assembly 80 holds the light board 81 with the plurality of LEDs 82, and one or more optics 85, and defines the positioning of the one or more optics 85 with respect to the LEDs 82. There are a variety of manners and devices for assembling and positioning the LEDs 82 and optics 85, and for securing the same into the luminaire 10. The LEDs 82 are typically mounted in position on, or created in, a printed circuit board (PCB) with each LED 82 electrically connected to a power feed wire. The optic 85 can be positioned over each LED. In one embodiment, the optic can be an #A 1M 5-N24 lens from Stock Drive Products/Sterling Instrument. Examples of LED and optic trays that hold the optics in position with respect to LEDs on a PCB are described in U.S. Patent Publ. 2006/146531, and in co-pending U.S. patent application Ser. No. 12/253,596, the disclosures of which are incorporated herein by reference. The optics can be replaced by, or used in conjunction with, one or more reflectors to direct light emitted from the LEDs 82 or other light sources. Examples of acceptable reflector(s) or reflector assemblies are described in U.S. patent application Ser. No. 12/166,536.

A representative structure and configuration for an LED assembly of the invention can include a substrate such as a light board, and typically a PCB, on which is mounted or created one or a plurality of LEDs, in any desired array, as is well known in the art. The circuitry for controlling and powering the LEDs can also be mounted or created on the PCB, or located remotely. The LEDs can be of any kind, color (i.e. emitting any color or white light or mixture of colors and white light as the intended lighting arrangement requires) and luminance capacity or intensity, preferably in the visible spectrum. Color selection can be made by one practicing the invention as the intended lighting arrangement requires. The LEDs contemplated within the teachings hereof can comprise any semiconductor configuration and material or combination that produce the intended array of color or colors. The LEDs can have a refractive optic built-in with the LED or placed over the LED, or no refractive optic; and can alternatively, or also, have a surrounding reflector that re-directs low-angle and mid-angle LED light outwardly. In one suitable embodiment, the LEDs are white LEDs each comprising a gallium nitride (GaN)-based light emitting semiconductor device coupled to a coating containing one or more phosphors. The GaN-based semiconductor device emits light in the blue and/or ultraviolet range, and excites the phosphor coating to produce longer wavelength light. The combined light output approximates a white output. For example, a GaN-based semiconductor device generating blue light can be combined with a yellow phosphor to produce white light. Alternatively, a GaN-based semiconductor device generating ultraviolet light can be combined with red, green, and blue phosphors in a ratio and arrangement that produces white light. In yet another suitable embodiment, colored LEDs are used, such are phosphide-based semiconductor devices emitting red or green light, in which case the LED assembly produces light of the corresponding color. In still yet another suitable embodiment, the LED light board includes red, green, and blue LEDs distributed on the PCB in a selected pattern to produce light of a selected color using a red-green-blue (RGB) color composition arrangement. In this latter exemplary embodiment, the LED light board can be configured to emit a selectable color by selective operation of the red, green, and blue LEDs at selected optical intensities. In one embodiment Nichia NS6W-083 series LEDs may be employed. Other LEDs are contemplated.

The lighting apparatus 10 typically receives an external power supply having an off-line voltage of 110-277 V, depending upon the local power system. In one embodiment, an external low voltage power system can be provided that converts the off-line voltage of 110-277 V AC from the local power system to the 24V constant current (mAmp range) required for the LED power and control components of the LED assembly 80. In another embodiment, the lighting apparatus 10 is configured for installation of an integrated LED power and control module, which converts off-line power directly to the low voltage constant current power required by the LEDs 82. The drivers and controllers of LED boards are routinely powered with 24V constant current, which can be mounted within a power supply and control module frame that is disposed within the housing 20.

One embodiment of an LED assembly 80 includes an LED light board 81, and an optic holding and positioning device 90 for holding a plurality of optics 85. The optic holding and positioning device 90 has an elongated channel member that includes an elongated planar base 91 and opposed sidewalls 92 joined integrally at the proximal edge to the planar base 91, and extending substantially normal from the base to distal edge 93. The device 90 also includes a plurality of optic holding positions that have an aperture 95 formed in and through the base 91, and opposed optic retaining means formed in the respective opposed sidewalls 92 adjacent transversely to the aperture. The aperture 95 is round and has a circular edge. When the optic 85 is disposed within the channel between the sidewalls 92, having its light-entering end 86 extending through the aperture 95 of the base, the circular edge engages the circumference of the conical sidewall of the optic 85 at a circular interface 88, preventing further axial movement of the optic in the axial direction. The circular edge of the aperture 95 also inhibits lateral movement and longitudinal movement of at least of the light-entering end of the optic. The circular edge of the aperture 95 therefore provides positioning of the light-entering end 86 of the optic 85 relative to the LED 82 with which the optic is positionally associated.

The optic retaining means includes a slot opening 96 formed into and through each sidewall 92, transversely adjacent the aperture 95 of base, having an upper edge as a linear segment that engages the upper rim 87 of the optic 85, and a lower edge that is typically convexly curved away from the upper edge to engage a portion of the conical sidewall of the optic 85, and resembles a crescent shape. When the optic 85 is disposed within the trough of the channel between the sidewalls 92 with its light-entering end 86 extending through the aperture 95 of the base, a portion of the upper rim 87 of the optic extends through each slot opening 96, whereby the upper edges of the slot openings 96 restrain the upper rim 87 of the optic 85 from movement in the opposed axial direction. The sidewalls have a flange 94 extending outwardly from its distal edge 93 for use in positioning and securing the optic holding device 90. The distal edges of the extending flange 94 of the optic holding and positioning device 90 are captured within a narrowed retainer slot 47 formed at a distal end of the lower wall portion 46b of the cartridge and/or with a securing screw 89. The slot 47 also provides sufficient clearance for sliding insertion of a window plate 99, prior to capping of the ends of the cartridge 40 with end plates 41, 43.

The optic holding device 90 can be spaced a distance from the LED light board 81, which spaces the optic from the LED, using a spacing means at one or more locations on the device 90. FIGS. 3 and 5 show a plurality of spacing means illustrated as gasket 97 disposed between the light board 81 and the optic holding device 90, with a fastening means illustrated as a threaded screw 89 passing through a hole to hold the optic holding device 90 to the light board 81. The spacer means 97 displaces the optic holding and position device 90 a selected distance from the LED light board 81, to position the light-entering end 86 of the optic lens 85 a selected distance above the LED 82. The cavity 86 of the optic lens 85 is typically concave inward to permit the optic to surround the LED 82, and capture and control virtually all of the light emitted by the LED. The concave inward portion can have a cylindrical shape, as shown in cross section in the figures, or can have a parabolic or other curved shape. The spacing means can be a gasket (such as gasket 97), bushing or other equivalent means, and typically is made of rubber, plastic or other resilient material, though a metal or hard plastic can also be used.

The fastening means illustrated as a threaded screw 89 also secures the LED light board 81 and the optic holding and positioning optic holding and positioning device 90 to the base 42 of the light cartridge 40, by insertion into the tapered channel 58.

The optic holding and positioning device 90 is typically formed from a metal or plastic sheet, which is preferably lightweight, flexible when manipulated, and resilient in order to retain its formed shape. In one aspect of the invention, the sheet material of the device is thermally conductive to dissipate heat generated by the LED, and has a reflective surface on the optic side. The thickness of the sheet material is selected to provide sufficient resilience to retain shape, with sufficient relaxability to allow manipulating the optic into the optic holding position. An aluminum sheet is preferred, having at least 10 mil thickness, and more typically about 50 mil to 200 mil thickness, and having a highly reflective surface, such as Miro-4 (minimum 95% reflectance), on the optic-positioning side of the device. Specular aluminum is preferred, although others are contemplated. The housing is typically made of aluminum by any of the well-known methods such as stamping, cold forming, die casting, permanent mold casting, machining or sand casting for forming aluminum commercially. The base plate, walls and ribs of the light cartridge are preferably made of an extruded or cast aluminum, which is lightweight, thermally conductive and inexpensive. The worm gear is typically made of an engineering plastic material, by well known methods, but other materials and methods are sufficient. Other parts can also be made of aluminum or plastics. The housing and other parts can also be made of other metals such as bronze and brass, or other as would be selected by one skilled in the art guided by these teachings. The parts can also be made of engineering plastic materials, such as by injection molding.

Figure 6:
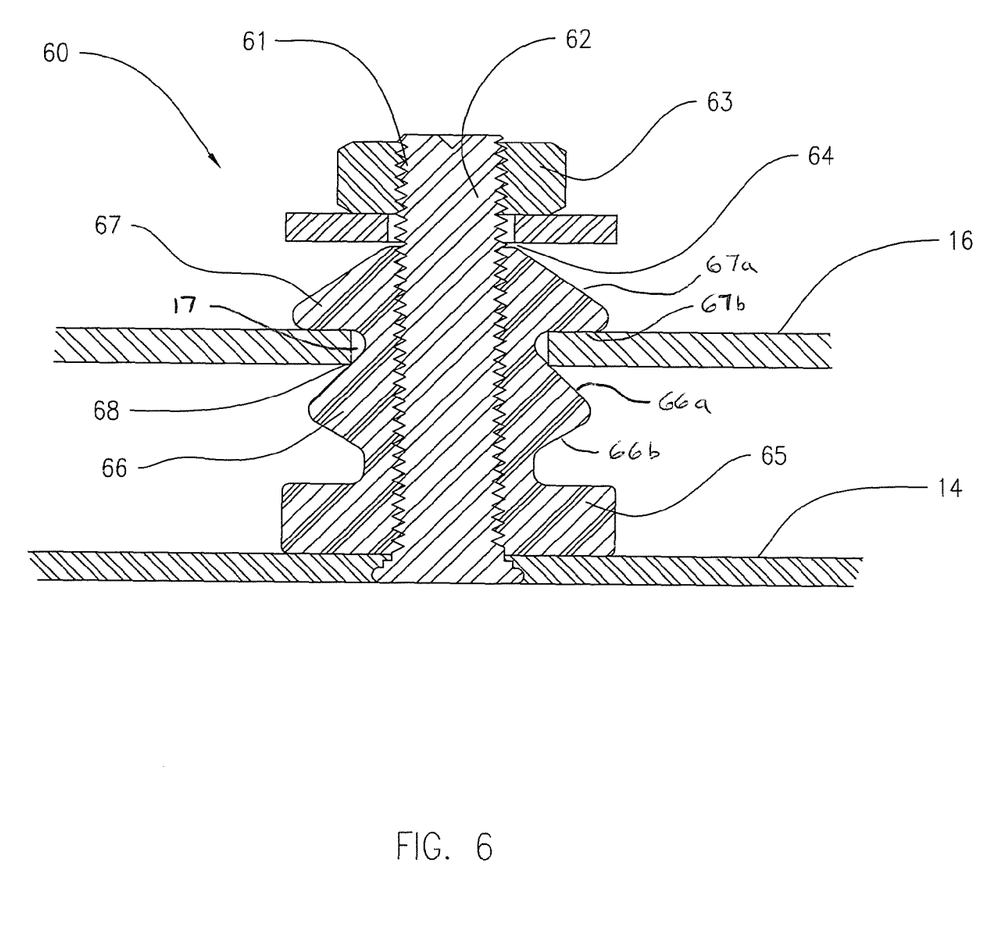
FIG. 6 shows a cross-sectional elevation view of the temporary grommet securing system, taken through line 6-6 of FIG. 3.

Another invention disclosed herein, and useable with the pivotable lighting assembly 10 described herein, is a securing grommet 60 shown in FIGS. 2, 3 and 6. The grommet 60 facilitates temporarily securing the luminaire to a structure wall 16, such as a ceiling, canopy, outdoor lamp post, or other horizontal, vertical or slanted surface, during installation. The grommet 60 is typically a molded element that includes a base 65, and a first outwardly-extending annular pleat 66 and a second outwardly-extending annular pleat 67 separated by a narrow waist portion 68. The grommet 60 has an axial hole 61 passing from the base 65 through the second pleat 67. The grommet 60 is positioned and secured over a threaded rod 62 extending from the mounting plate 14 of the housing 10, which has a threaded diameter slightly larger than the inner diameter of the axial hole 61. The grommet 60 can be either press-fit over the threaded rod 62, or can be threaded onto the rod 62. The base 65 can be molded into a hexagonal shape to facilitate use of a hand tool, such as a socket wrench or equivalent, to thread the grommet 60 onto the threaded rod 62. A front face 67a of the second pleat 67 is tapered inwardly and upwardly from its outer perimeter toward the distal end 64 of the grommet 60 to deform the pleat 67 backward during insertion into a securing hole 17 formed into the structure wall or plate 16. The back face 67b of the second pleat 67 extends substantially parallel to a plane perpendicular to a longitudinal axis of the grommet hole 61.

The diameter of the second pleat 67 is larger than the diameter of the securing hole 17. The second pleat 67 is configured in shape and with sufficient flexibility to fold or compress inwardly toward the waist 68 when forced through the hole 17. When the annular rim of the second pleat 67 clears the hole 17, the elastomeric material of the grommet 60 causes the second pleat 67 to spring outwardly, allowing the back face 67b of the second pleat 67 to engage the structure wall or plate 16 trapped between the first pleat 66 and second pleat 67. The outer perimeter of the grommet 60 may be annular, hexagonal or of any other shape. Similarly, the angle of taper of the second pleat front face 67a may vary to facilitate easy insertion of the grommet 60 into hole 17. Additionally, the grommet 60 may be used to secure objects other than a lighting apparatus.

Though flexible, the material of the grommet 60, in conjunction with its shape, possesses sufficient structural rigidity to prevent the second pleat 67 from being pulled back through the hole 17 under the weight of the lighting apparatus 10. The grommet 60 thereby facilitates easy and quick securement of the lighting apparatus 10 to the structure wall or plate 16. If additional security is desired, a securing nut 63 can optionally be threaded onto the rod 62, as shown in FIGS. 2, 3 and 6. The downward force of the nut 63 with an optional washer (depicted in FIGS. 2, 3 and 6) compresses the first and second pleats of the grommet 60 against the opposed openings of the hole 17 and around the shaft of the rod 62, thereby forming an effective water seal.

The grommet material is typically a rubber or other elastomer, such as silicon or ethylene propylene diene monomer (EPDM, a terpolymer of polyethylene, polypropylene and a diene-component) rubber. In one embodiment, the grommet is comprised of a thermoplastic elastomer sold under the trade name Santoprene™. Other non-limiting examples of elastomer material include natural rubber, polyisoprene, butyl rubber (copolymer of isobutylene and isoprene), halogenated butyl rubbers, polybutadiene, styrene-butadienie rubber (copolymer of polystyrene and polybutadienie), nitrile rubber (copolymer of polybutadiene and acrylonitrile, also called buna N rubber), hydrated nitrile rubbers, chloroprene rubber, polychloroprene, neoprene, baypren, EPM (ethylene propylene rubber, a copolymer of polyethylene and polypropylene), epichlorohydrin rubber, polyacrylic rubber, fluorosilicone rubber, fluoroelastomers, perfluoroelastomers, tetrafluoro ethylene/propylene rubbers, chlorosulfonated polyethylene, ethylene-vinyl acetate (EVA), and polyurethane rubber.

In one example, the first and second pleats 66, 67 of the grommet 60 both have a diameter of 0.700 inches and a taper from outermost perimeter of 20.5 degrees, the waist 68 has a diameter of 0.375 inches, and the back faces 66b, 67b are each one degree toward the front face 66a, 67a from perpendicular to the longitudinal axis of the grommet 60. Unlike the embodiment depicted in FIG. 6, the first and second pleats 66, 67 are of substantially the same shape. This exemplary grommet is employed for securing within a ⅝ inch diameter hole when made of Santoprene™.

While the inventions have been disclosed by reference to the details of preferred embodiments, the disclosure is intended in an illustrative rather than in a limiting sense, as it is contemplated that modifications will readily occur to those skilled in the art, within the spirit of the invention and the scope of the appended claims.

I claim:

1. A lighting apparatus comprising:
   (A) a housing having opposed first and second ends:
   (B) a light cartridge associated with the housing, the light cartridge for holding at least one light source and comprising:
      i) a first end and a second end;
      ii) a pivot associated with each of the first and second ends and rotatably engaging the housing;
      iii) at least one elongated wall extending between the first and second ends and about at least a portion of the perimeter of the light cartridge;
      iv) at least one rib extending from the elongated wall at least a portion of the way between the first and second ends of the light cartridge; and
   (C) a gear engaged with at least one of the at least one ribs of the light cartridge, such that rotation of the gear rotates the light cartridge about its pivot.

2. The lighting apparatus according to claim 1 wherein the gear is a worm gear having a longitudinal axis perpendicular to a longitudinal axis defined by the light cartridge, the worm gear having a helical thread at a pitch in mechanical engagement with a portion of at least one of the at least one ribs.

3. The lighting apparatus according to claim 1 wherein the light cartridge comprises a plurality of ribs each define a distal edge and the distal edges of the plurality of ribs form an arc.

4. The lighting apparatus according to claim 1 wherein the light cartridge defines a longitudinal axis and comprises a base oriented along the longitudinal axis and connecting the first end, second end and at least one wall.

5. The lighting apparatus according to claim 4 wherein the wall extends circumferentially and in opposed directions from the at least one lateral edge of the base.

6. The lighting apparatus according to claim 1 wherein the light source is an LED.

7. The lighting apparatus according to claim 1 wherein the at least one rib extending from the elongated wall is oriented to extend continuously from the first end to the second end of the light cartridge.

8. A light cartridge for holding at least one light source and being pivotally associated with a light housing, the light cartridge comprising:
   (A) a first end and a second end;
   (B) at least one elongated wall extending between the first and second ends and about at least a portion of the perimeter of the light cartridge;
   (C) a pivot associated with each of the first and second ends for rotatably engaging the light housing; and
   (D) at least one rib extending from the elongated wall at least a portion of the way between the first and second ends of the light cartridge;
wherein the at least one rib for engaging a gear of the light housing such that rotation of the gear rotates the light cartridge about its pivot.

9. The light cartridge according to claim 8 further comprising a plurality of light sources and a plurality of optics associated with the light source.

10. The light cartridge according to claim 8 further comprising a plurality of ribs each define a distal edge and the distal edges of the plurality of ribs form an arc.

11. The light cartridge according to claim 8 defining a longitudinal axis and further comprising a base oriented along the longitudinal axis and connecting the first end, second end and at least one wall.

12. The light cartridge according to claim 11 wherein the wall extends circumferentially and in opposed directions from the at least one lateral edge of the base.

13. The light cartridge according to claim 8 wherein the light source is an LED.

14. The light cartridge according to claim 8 wherein the cartridge comprises a light source.

15. The light cartridge according to claim 9 further comprising an optic holder holding each of the plurality of optics and a space spacing the optics from the light sources.

* * * * *